United States Patent

[11] 3,612,729

| [72] | Inventor | Roger Commarmot |
| | | Lyon, France |
| [21] | Appl. No. | 811,335 |
| [22] | Filed | Mar. 28, 1969 |
| [45] | Patented | Oct. 12, 1971 |
| [73] | Assignee | Rhone-Poulenc S.A. |
| | | Paris, France |
| [32] | Priority | Mar. 29, 1968 |
| [33] | | France |
| [31] | | 146,469 |

[54] VOLUMETRIC METERING PUMP
3 Claims, 3 Drawing Figs.

| [52] | U.S. Cl. | 417/415, 417/505, 417/517, 417/521 |
| [51] | Int. Cl. | F04b 35/04, F04b 23/06, F04b 39/08 |
| [50] | Field of Search | 103/227, 169–171, 211, 214; 230/184, 185; 417/505, 415, 517, 521 |

[56] References Cited
UNITED STATES PATENTS

| 1,327,423 | 1/1920 | Dryen | 103/227 |
| 2,104,373 | 1/1938 | McNeil et al. | 103/227 |
| 2,956,511 | 10/1960 | Morehead | 103/211 |
| 3,208,388 | 9/1965 | Glasgow | 103/170 |
| 3,259,077 | 7/1966 | Wiley et al. | 103/169 |
| 3,335,724 | 8/1967 | Gienapp | 103/214 |
| 3,343,728 | 9/1967 | Brill et al. | 103/214 |

FOREIGN PATENTS

| 1,139,160 | 1/1957 | France | 103/227 |
| 466,442 | 9/1928 | Germany | 103/227 |
| 732,296 | 2/1943 | Germany | 103/171 |

*Primary Examiner*—William L. Freeh
*Attorney*—Cushman, Darby & Cushman

ABSTRACT: The specification describes a volumetric metering pump for accurately dosing very small quantities of liquid, in which two pistons are arranged to extend in opposite directions, and are interconnected by a crossmember. Small pulse jerks are simultaneously applied to each piston, so that one piston draws liquid into its cylinder and the other expels liquid from its cylinder. A slide valve is provided firstly to direct liquid from an inlet duct to one cylinder and to an outlet duct from the other cylinder. At the end of the stroke this situation is reversed.

VOLUMETRIC METERING PUMP

The present invention relates to a volumetric metering pump of the reciprocating plunger type which is intended to supply continuously, with very high precision, very small quantities of liquid.

In many cases, it is necessary to deliver uniformly and continuously, with high precision, very small quantities of liquid and to meter continuously, with very high precision, limited quantities of liquid. Now, it is known that the present techniques do not permit of readily ensuring continuous deliveries, of less than 50 or 100 cc. per hour, with a precision better than 1 percent. In addition, it is extremely difficult to meter continuously limited quantities of liquid with a very high precision, the precision rarely reaching 0.5 percent under the best conditions.

The metering pumps most commonly employed, more particularly for very small deliveries, are usually of the rectilinear piston type and which are provided with valve. The quantity delivered is generally adjusted by adjusting the stroke of the piston. In order to obtain continuity of the delivery, it is necessary to provide a number of elemental pumps in association.

Such pumps are best adapted for ensuring uniformly pulsed continuous deliveries of the order of 50 cc. per hour with a precision of 1-2 percent, but it is found that this precision decreases very rapidly at low deliveries, because uncontrollable errors occur, which accumulate at each pulse.

Syringe-type pumps are also employed for very small deliveries. In this type of pump, cumulative errors are encountered due to the reciprocating movement of the piston and in addition problems of fluid-tightness and lubrication arise, so that this type of pump is not entirely satisfactory. In addition, the liquid is generally transferred from one syringe to the other by devices which introduce a slight error, which is distinct from the preceding errors, but is also cumulative.

The present invention provides a volumetric metering pump for accurately dosing very small quantities of liquid, such pump comprising first and second cylinders, first and second identical interconnected pistons in said first and second cylinders respectively, the ratio of the length to the diameter of said pistons being between 2:1 and 100:1, first and second conduits connected to said first and second cylinders respectively to lead liquid to be pumped to and from said cylinders, an inlet and an outlet duct connected to said first and second conduits by a valve, whereby when said valve is in a first position the inlet duct is connected to the first conduit and the outlet duct to the second conduit, and when the valve is in the second position, the inlet duct is connected to the second conduit and the outlet duct is connected to the first conduit, means to move the first and second pistons alternately in two strokes, simultaneously and equally, in pulsed jerks, firstly in a direction to draw liquid doses into the first cylinder and expel liquid doses from the second cylinder, when the valve is in the first position, and subsequently at the end of a stroke of the pistons, to move the latter in the opposite direction, to draw liquid doses into the second cylinder and expel the liquid doses from the first cylinder, when the valve is in the second position, and means to reverse the operation of the valve moving means and the piston moving means at the end of each stroke, in the interval of time between two consecutive pulses, without modifying the duration of this interval.

In order that the invention may more readily be understood, the following description is given, merely by way of example, reference being made to the accompanying drawings, in which.

Figure 1:
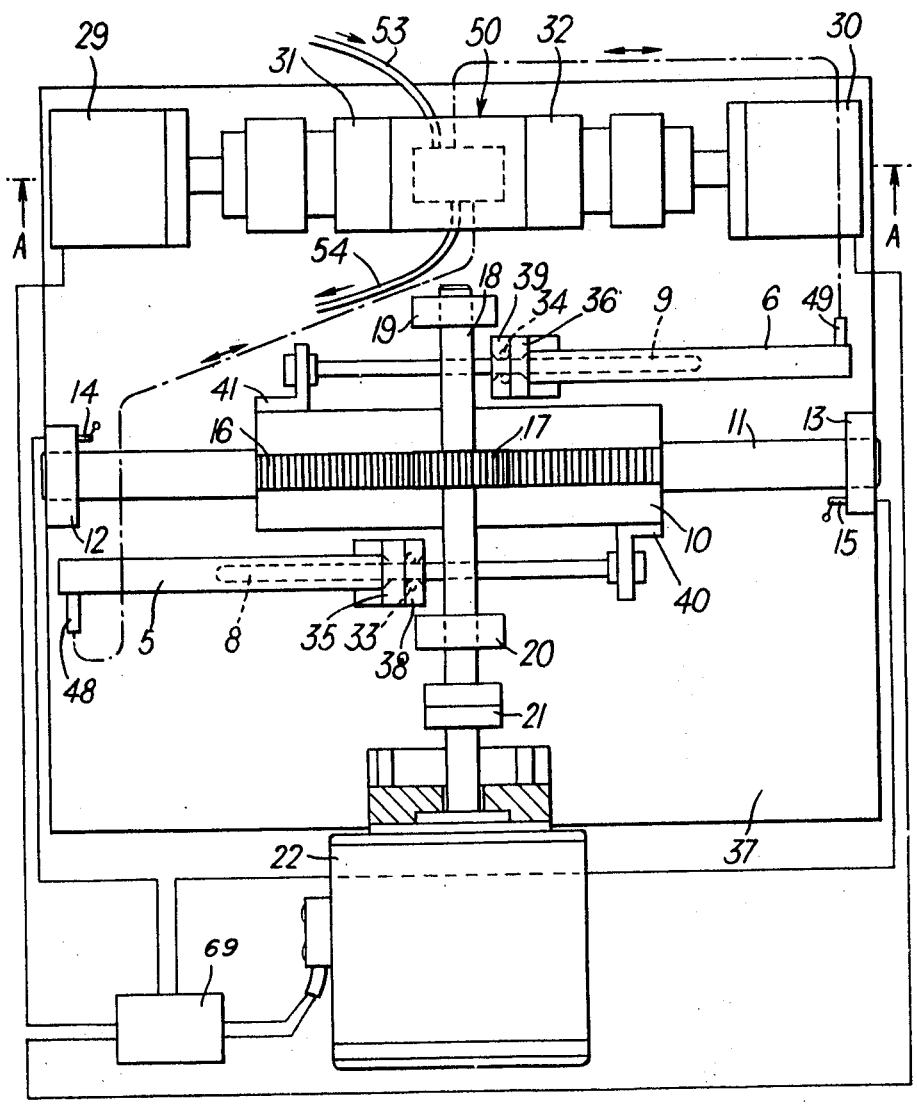
FIG. 1 is a plan of one embodiment of volumetric metering pump according to the invention.

Referring now to the drawings, there is illustrated one embodiment of pump according to the invention. This includes a first cylinder 5 and a second cylinder 6, in which are axially slidable a first piston 8 and a second piston 9 respectively. The two cylinders 5 and 6 and the pistons 8 and 9 are arranged in opposite directions and the two pistons which are identical, are connected to a common member 10, by means of brackets 40 and 41 respectively. The member 10 is axially slidable along a guide rod 11, which is carried at each end in a stop member 12 and 13, which support microswitches 14 and 15 to be described later.

Extending longitudinally of the member 10, is a rack 16 engaged by a pinion 17 mounted on a shaft 18 carried by bearings 19 and 20, flanges 21 connecting the shaft 18 to a pulsating motor 22. The abutment members 12 and 13, and the pulsating motor 22 are mounted on a fixed frame 37, which also carries a valve assembly 50 together with its associated parts, as illustrated in greater detail in FIG. 3.

As can be seen in this figure, the valve assembly 50 comprises a fixed valve member 51 and a movable valve member 52 urged against the fixed valve member 51 by a spring 24. The movable valve member 52 is provided with passageways 58 and 59 which are connected to an inlet duct 53 and an outlet duct 54. Similarly, the fixed valve member 51, which is bolted to a subframe 28 mounted on the frame 37, is provided with three passageways 60, 61 and 62, the passageways 60 and 62 being connected in the form of a "U." The passageway 61 is connected to a first conduit 48 and thence to the first cylinder 5, while the conduit 60 is connected to a second conduit 49 and thence to the second cylinder 6.

Interposed between the fixed and movable valve members is a gasket 57 provided with passageways aligned with those of the fixed member 51.

In the drawings, the valve member 52 is illustrated in an intermediate position. In fact it is movable between a first position which is to the left of this intermediate position by a solenoid 29, operating the valve by means of the connecting rod 23 mounted in the bearing 26. Similarly a solenoid 30 is provided to move the valve member 52 to the right to a second position, through the intermediary of a connecting rod 25 mounted in a bearing 27.

The displacement of the movable valve member 52 is controlled by abutment against two end members 31 and 32, so that the passageways 58 and 59 are accurately aligned either with the passageways 60 and 61, or with the passageways 61 and 62.

Figure 2:
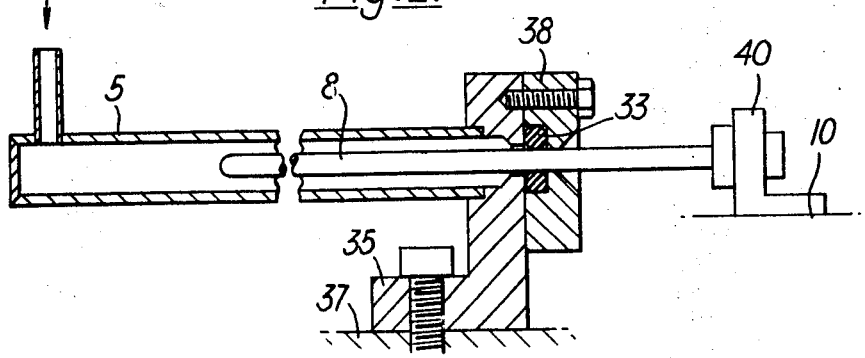
FIG. 2 is a fragmentary sectional view showing one of the pistons and cylinders of the pump of FIG. 1.

As can be seen in FIG. 2, the cylinder 5 is mounted on the frame 37 by means of a bracket 35. Bolted to the bracket 35 is an end plate 38 which houses an O-ring-type seal or packing 33, to ensure sealing tightness of the piston in the cylinder. The cylinder 6 is similarly mounted and sealed by means of a bracket 36 having an end plate 39 in which is located a seal or packing 34.

In operation of the above-described apparatus, the inlet duct 53 is connected to a suitable source of liquid, and the outlet duct 54 to a location at which doses are to be dispensed. The motor 22 in this construction consists of a stepping electric motor, which rotates through a predetermined angle under the action of an electronic pulse supplied by an electronic device of known type (not shown). Such a mechanical pulse generator also serves a mechanical pulse regulator, because of the successive angles through which it turns have not an absolutely identical value, the differences observed do not add together, and the errors introduced are not cumulative.

This mechanical pulse-generating device rotates alternately in one direction and in the opposite direction, the changeover of the direction of rotation being successively brought about by each of the two switches 14 and 15. Thus, when the motor 22 is rotating in one direction, the shaft 18 and pinion 17 are caused to move around in a jerky fashion, thus moving the rack 16 and the member 10 in a jerky manner along the guide rod 11. Assuming that these members are all moving to the left as viewed in FIG. 1, the piston 8 is moved to force liquid out through the conduit 48 to the valve assembly 50.

The electrical connection between the switches 14 and 15 and the solenoids 29 and 30, via an electrical control switching arrangement 69, is such as to ensure that the valve is in the first position, having been moved by the solenoid 29. With this arrangement, liquid as indicated above is forced through the conduit 48 into the passageway 61 and thence into the passageway 59 and leaves via the outlet duct 54. At the same time, the piston 9 moves to the left in the cylinder 6 and draws liquid in via the inlet duct 53, the passageway 58, the passageway 60 and the conduit 49. The pulses are of substantially equal length and duration.

The member 10 and its associated parts continue to move to the left until the member 10 strikes the limit switch 14. Suitable delay is arranged so that the switch is only effective in the space between two pulses. When the switch operates, it sends a signal via switching arrangement 69 to cause the motor to reverse its direction of rotation and also to deenergize the solenoid 29 and energize the solenoid 30. The member 10 then moves to the right in pulses and the reverse situation takes place, liquid being expelled from the cylinder 6 and drawn in the cylinder 5. Again reversal will take place when the member 10 operates the microswitch 15.

The diameter of the pistons 8 and 9, which are identical is not critical. However, it is preferred that the length of each piston should be large in relation to its diameter. The ratio of the length of diameter which will be between 2:1 and 100:1, and preferably between 10:1 and 50:1. Each piston moves within the cylinder without contact with the walls, and is guided only by means of the end plates 38 and 39, and in contact with the packings 33 and 34.

There may with advantage be provided in association with the mechanical pulse generator, a mechanical, electromechanical or electronic speed-varying device for adjusting at will the time between two successive pulses. A speed-varying device permits of readily adjusting a dose to the desired value and of covering a wide range of doses.

There may also be advantageously provided in association with the mechanical pulse generator any pulse counter or programmer, to count the number of pulses occurring at a given time, and therefore to indicate exactly the quantity of liquid delivered, with a relative precision which is higher in proportion as the number of pulses is greater. The pump may also be stopped when it has produced a predetermined number of pulses, whereby the metered quantity of liquid may be accurately preselected. It is also possible to vary the delivery as a function of a variable quantity.

The pump according to the invention is specially adapted to precision metering and to microdeliveries, and various modifications may be made in the construction thereof. If desired, other types of pulse generators and regulators, for example a mechanical ratchet wheel device or any other equivalent device may be used.

Many modifications in design may also be made. For example, the intake and delivery ducts may be connected to the fixed part of the slide valve and the changeover may be effected by means of the arrangement of the channels in the movable part. It is also possible to modify the form and the arrangement of the parts, as also the nature and the quality of the materials employed.

The pump according to the invention has a number of remarkable features. It substantially eliminates the slightest cause of error usually observed in pumps employed for microdeliveries and precision metering. The various parts of the pumping circuit are readily rendered fluidtight by virtue of the small dimensions of the parts in frictional engagement and by virtue of their high constructional quality. No leakage is observed even at pressures of several bars.

The fluid-tightness between each piston and the pump body within which it moves is ensured by a packing disposed in a fixed location. Lubrication of the piston is unnecessary and the precision does not depend upon the quality of the machining of the bore in the pump body.

At each changeover, the displacement of the sliding valve member interrupts the flow of liquid without displacing it or imparting any energy thereto. As the changeover takes place in the interval of time between two consecutive pulses, without modifying the duration of this interval, it does not introduce any error at the reversal of the direction or displacement of the pistons.

The volume of the liquid displaced by the pump at each pulse is very small, but it cannot be absolutely constant, which introduces a minimum error in relation to this very small volume. Because of the pulse regulator, this error is not cumulative, and therefore remains substantially constant in value regardless of the volume of liquid delivered. It is therefore possible to meter with extreme precision relatively large limited quantities of liquid.

Since the pump does not include any clock valves, it is insensitive to upstream and downstream pressure variations, and it offers remarkable operating stability.

The amplitude of the displacements of the pistons may be adjusted to a very small value, for example by choosing a step-by-step motor capable of performing a large number of steps per revolution, or by choosing an appropriate reduction ratio between the pulse generator and the member driving the pistons. This makes it possible to ensure a substantially constant continuous delivery, the pulsations of the liquid being minute. Moreover, the delivery may readily be adjusted by means of a suitable speed changer which adjusts the frequency of the mechanical pulses.

The pump according to the invention may be employed in chemical, biological, analytical and other laboratories. For example, it may be employed in the chromatography in order to effect automatic titrations.

EXAMPLE

Figure 3:
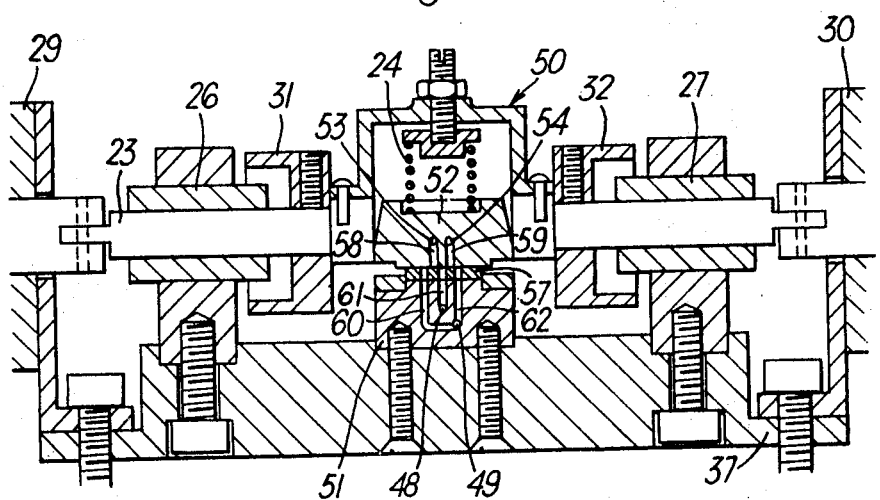
FIG. 3 is a fragmentary section taken on the line A—A of FIG. 1.

A pump as illustrated in FIGS. 1, 2 and 3 was constructed. The metallic parts in contact with the liquid were formed from nickel-chromium-molybdenum stainless steel of the 18/8/2 type. The fixed valve member was formed with passageways of a diameter of 1 mm. and at intervals of 3 mm. in its front face, these passageways communicating with the lateral faces, one at the center with the end of the cylinder 6 and the other two with one another and with the end of the cylinder 5. The gasket 7 was formed of polytetrafluoroethylene, of a thickness of 1 mm., having three holes of a diameter of 1 mm. in register with the passageways in the fixed valve member. The sliding valve member had two passageways of a diameter of 1 mm., spaced 3 mm. apart, which were laterally connected to the inlet and outlet ducts, which were formed as polytetrafluoroethylene tubes having an internal diameter of 1.5 mm. and a thickness of 0.25 mm., connected to the members of the pump by screw-threaded end fittings.

The cylinders 5 and 6 consisted of tubes having an internal diameter of 4 mm. and a length of 80 mm., the torroidal sealing or packing consisting of a copolymer of vinylidene fluoride and hexafluoropropylene, which ensures fluid-tightness around a trued piston having a diameter of 2.5 mm. and a length of 85 mm.

Drive was provided by way of a pinion 17 having 35 teeth engaging in the tooth rack, the pinion teeth having a modulus of 0.75. This pinion was driven by a step-by-step motor performing 200 steps in each revolution, each step therefore corresponds to an angle of rotation of 1.8°. The angle of rotation corresponding to one step was performed with a precision of more than 0.3°. This error was not cumulative and always remains below 0.3° regardless of the number of steps performed. An electronic device of known type applied to the step-by-step motor successive pulses by which it was rotated in the desired direction. Each step of the motor imparts to the pistons a pulse which displaces them longitudinally.

The stroke of the pistons was adjusted to a valve of 160 pulses. The switches 14 and 15 effected in less than 0.1 second the reversal of the direction of rotation of the step-by-step motor, as also the displacement of the sliding valve member through two electromagnets. Reproducibility tests were made with this pump. The speed of the motor was so adjusted that the pump delivered 20 cc. per hour of a distilled water previously degasified and maintained at a temperature of 20° C. The pumped distilled water was collected in a weighing scoop disposed on a balance, the sensitivity of which is 0.1 mg. The graduations corresponded to 0.5 mg. and the readings were systematically rounded off to the nearest graduation.

The following tests were made:

a. 150 pulses on the piston 8 without changeover

The same test was repeated 15 times under the same conditions, and it was found that the average weight of water delivered in each test was 299.5 mg. and that the maximum deviation was ±0.5 mg. The reproducibility of the tests, equal to the ratio of the maximum deviation of the measured weights from the mean weight delivered, was ±0.17 percent.

b. 150 pulses on the piston 9 without changeover

The same test was performed 15 times under the same conditions as before. It was found that the average weight of water delivered at each test is 299 mg. and that the maximum deviation was ±0.5 mg. The reproducibility was equal to ±0.17 percent.

C. 620 pulses and 3 automatic changeovers

Eleven similar tests were carried out under the same conditions. It was found that the average weight of water delivered at each test was 1,235.1 mg. and that the maximum deviation was ±2 mg. The reproducibility was equal to ±0.16 percent. It was found that this was not reduced by the automatic changeovers.

d. 3,000 pulses and 18 automatic changeovers

Thirteen similar tests were performed under the same conditions. It was found that the average weight of water delivered at each test was 5,972 mg. and that the maximum deviation was ±2.8 mg. The reproducibility was equal to ±0.047 percent. It was found that, since some of the errors were not cumulative, the precision of the measurements was higher as the quantity of liquid supplied was greater.

e. 150 pulses on the piston 8 without changeover

The weighing scoop which collected the distilled water was disposed in a chamber under pressure.

Ten similar tests were performed, the chamber being maintained under a pressure equal to 1.5 bar, and then 5 similar tests, the chamber being maintained under a pressure equal to 2 bars.

It was found that in these two series of tests the average weight of water delivered was 299 mg. and that the maximum deviation was ±0.5 mg. The reproducibility was equal to ±0.17 percent. The quantity of liquid delivered was only 0.17 percent less than that delivered in the series of tests (a).

I claim:

1. An improved volumetric liquid metering pump to deliver uniformly and continuously with very high precision limited quantities of liquid, said pump comprising in combination:
   a. first and second parallel cylinders;
   b. first and second identical pistons reciprocable in said first and second cylinders respectively, the ratio of length to diameter of said pistons being between 2:1 and 100:1;
   c. a slidable member carrying said pistons which extend parallel to each other and in opposite directions thereupon, with attachment means connecting the first and second pistons with the slidable member and forming a rigid body;
   d. a rack on said slidable member;
   e. a pinion engaging said rack forming the sole driving means for the slidable member;
   f. a stepping reversing motor operatively connected to rotate said pinion;
   g. a fixed valving member;
   h. a valving member movable with respect to said fixed valving member between first and second pumping positions and forming with said fixed valving member a valve assembly;
   i. a pair of solenoids effective to move said movable valving member between said first and second pumping positions;
   j. a pair of conduit means connecting each cylinder separately to said valve assembly;
   k. liquid inlet means and liquid outlet means connected to said valve assembly;
   l. passage means in said valve assembly connecting said inlet means to one of said conduit means and said outlet means to the other of said conduit means when said movable valving member is in said first pumping position, and connecting said outlet means to said one conduit means and said inlet means to said other conduit means when said movable valving member is in said second pumping position;
   m. a pulse generator effective to operate said motor in equal pulsed jerks;
   n. a pair of limit switches, one at each end of the travel of said slidable member, and operated by said slidable member effective to actuate said solenoids to move said valving member from one of its pumping positions to the other, and effective to reverse the direction of operation of said motor, at the end of each stroke of said pistons; and
   o. delay means effective to insure that said limit switches can operate only in an interval between two consecutive jerks.

2. A pump as specified in claim 1, wherein said pistons have a ratio of length to diameter between 10:1 and 50:1.

3. An improved volumetric liquid metering pump to deliver uniformly and continuously with very high precision limited quantities of liquid, said pump comprising in combination:
   a. first and second parallel cylinders;
   b. first and second identical pistons reciprocable in said first and second cylinders respectively, the ratio of length to diameter of said pistons being between 2:1 and 100:1;
   c. a slidable member carrying said pistons which extend parallel to each other and in opposite directions thereupon;
   d. a rack on said slidable member;
   e. a pinion engaging said rack;
   f. a stepping reversing motor operatively connected to rotate said pinion;
   g. a fixed valving member;
   h. a valving member movable with respect to said fixed valving member between first and second pumping positions and forming with said fixed valving member a valve assembly;
   i. a pair of solenoids effective to move said movable valving member between said first and second pumping positions;
   j. a pair of conduit means connecting each cylinder separately to said valve assembly;
   k. liquid inlet means and liquid outlet means connected to said valve assembly;
   l. passage means in said valve assembly connecting said inlet means to one of said conduit means and said outlet means to the other of said conduit means when said movable valving member is in said first pumping position, and connecting said outlet means to said one conduit means and said inlet means to said other conduit means when said movable valving member is in said second pumping position;
   m. a pulse generator effective to operate said motor in equal pulsed jerks;
   n. a pair of limit switches, one at each end of the travel of said slidable member, and operated by said slidable member effective to actuate said solenoids to move said valving member from one of its pumping positions to the other, and effective to reverse the direction of operation of said motor, at the end of each stroke of said pistons;
   o. delay means effective to insure that said limit switches can operate only in an interval between two consecutive jerks;
   p. a gasket placed between said fixed valving member and said movable valving member, and
   q. spring means urging said movable valving member against said gasket.